June 1, 1954     J. GEIGER ET AL     2,679,795
BREATHERSHAFT SAFETY VENTILATING SYSTEM
Filed May 24, 1950
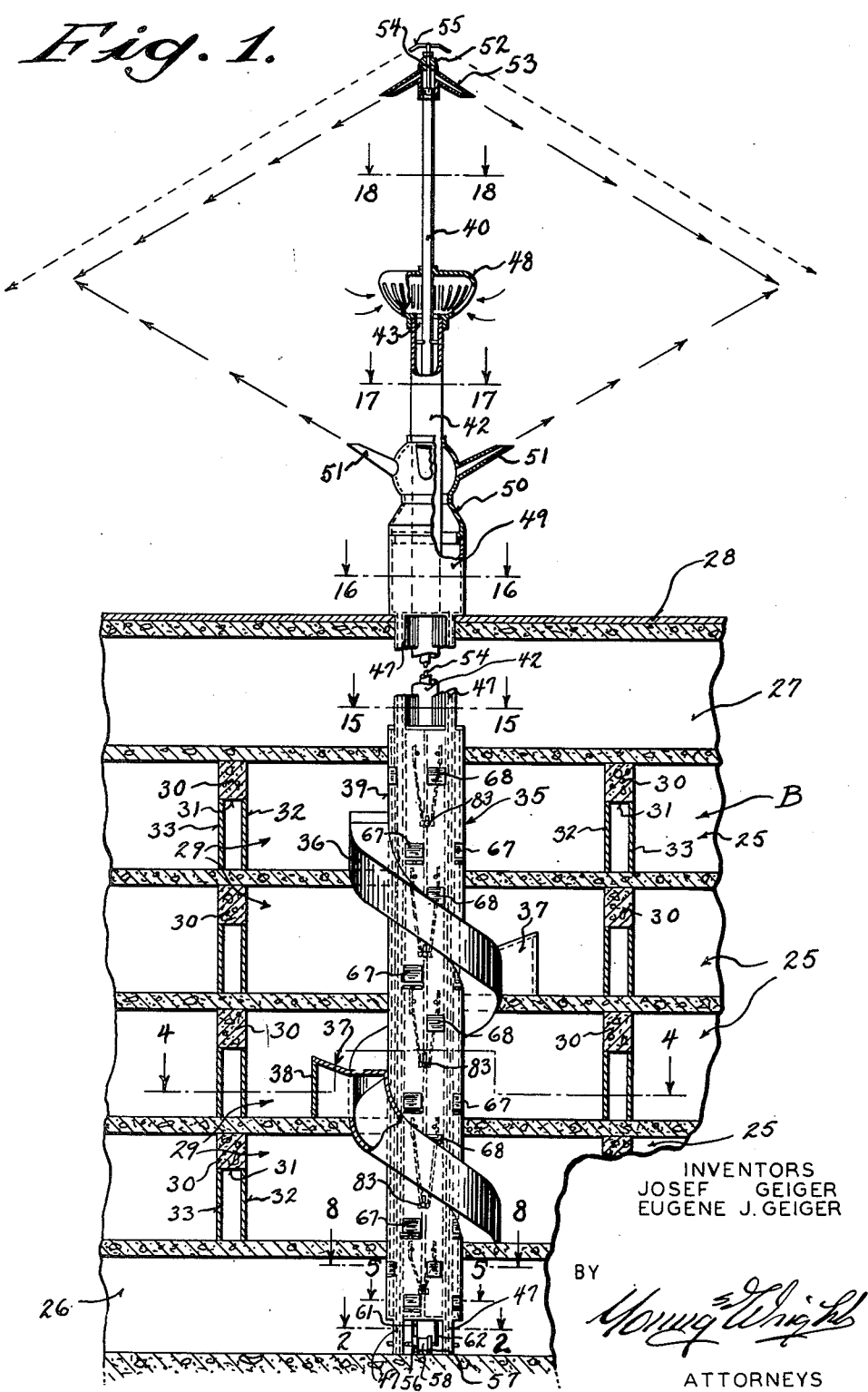

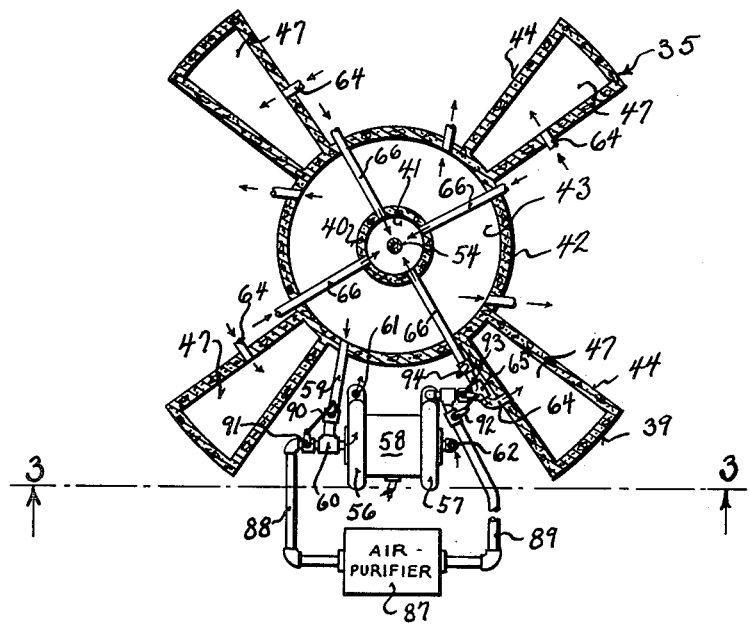
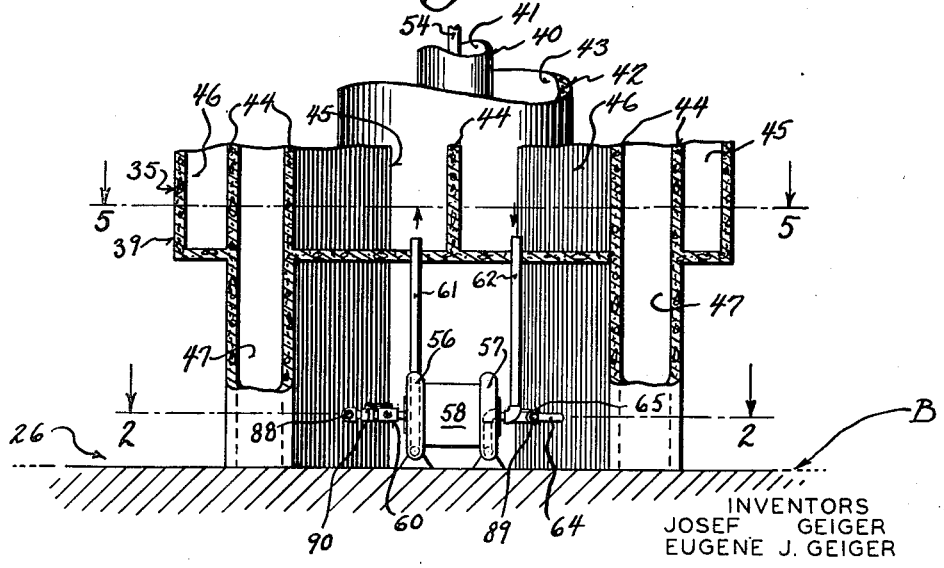

INVENTORS
JOSEF GEIGER
EUGENE J. GEIGER

BY

ATTORNEYS

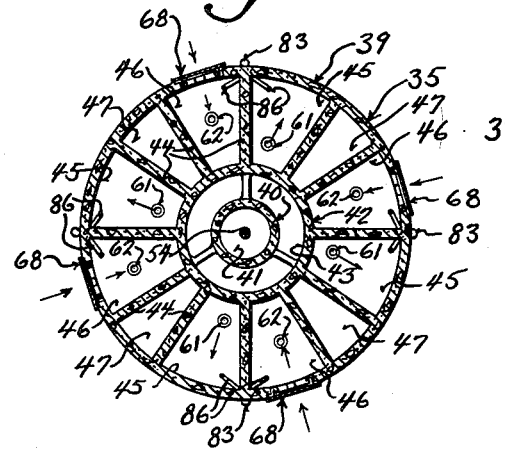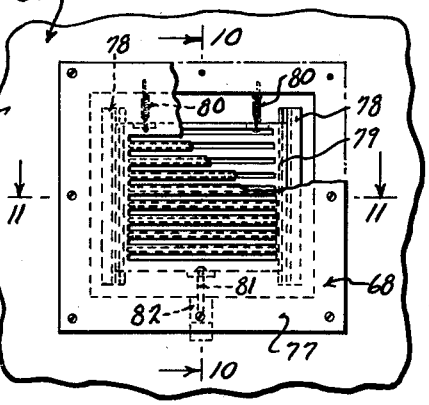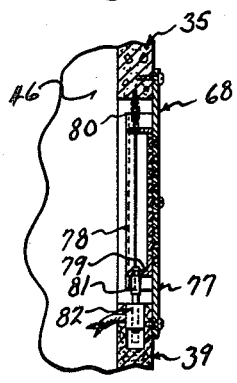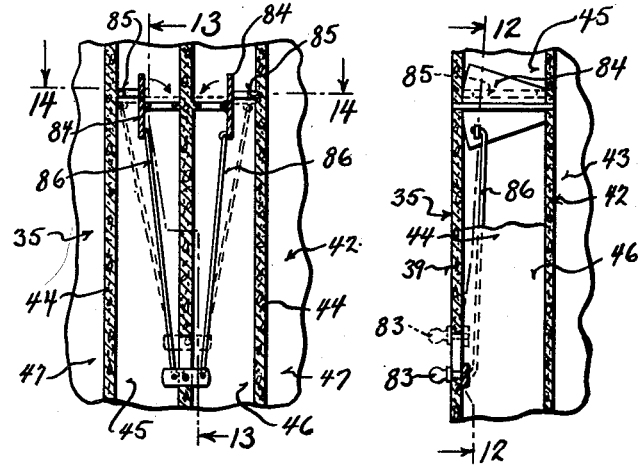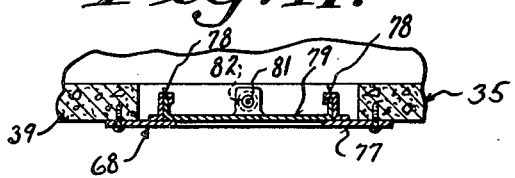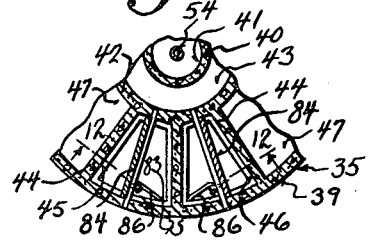

June 1, 1954 J. GEIGER ET AL 2,679,795
BREATHERSHAFT SAFETY VENTILATING SYSTEM
Filed May 24, 1950 6 Sheets-Sheet 5

INVENTORS
JOSEF GEIGER
EUGENE J. GEIGER

BY
ATTORNEYS

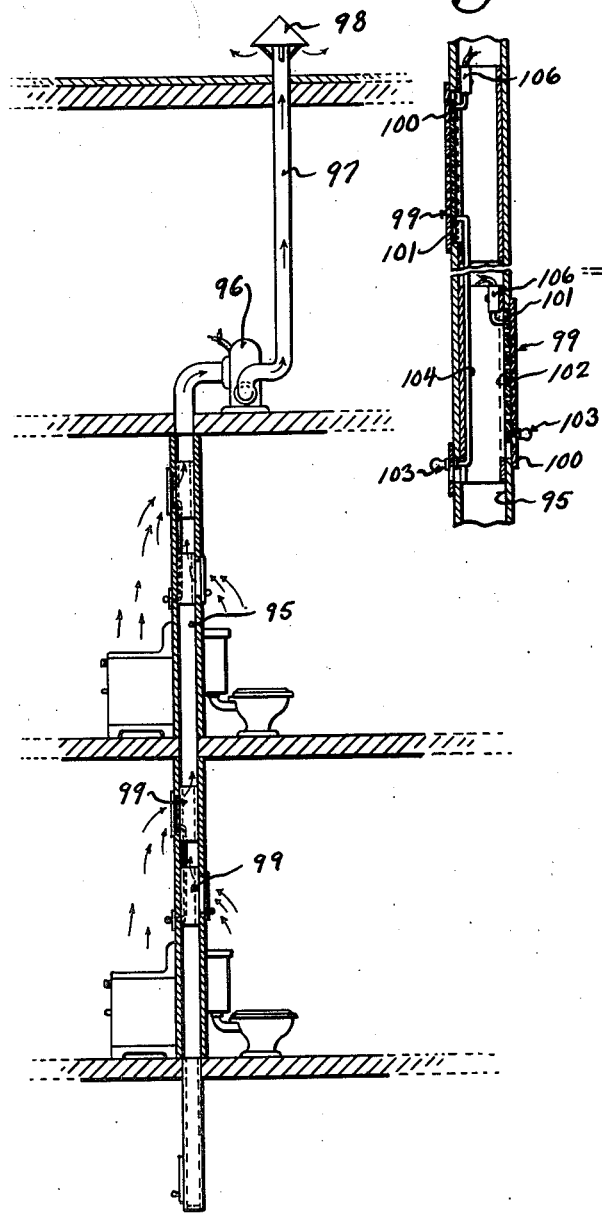
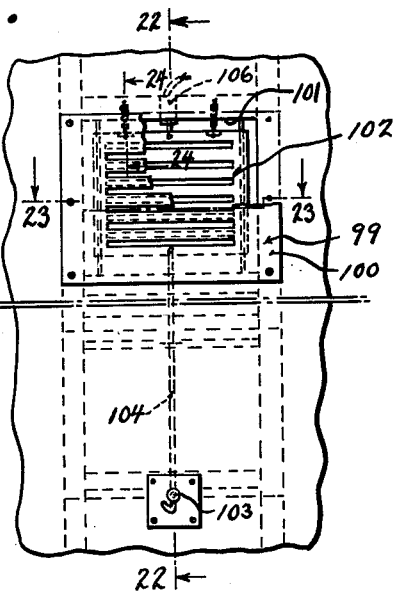
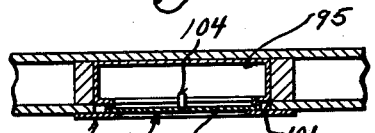
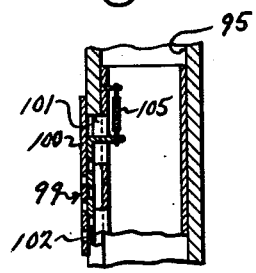
INVENTORS
JOSEF GEIGER
EUGENE J. GEIGER Patented June 1, 1954

2,679,795

UNITED STATES PATENT OFFICE 2,679,795

BREATHERSHAFT SAFETY VENTILATING SYSTEM

Josef Geiger and Eugene J. Geiger,
Milwaukee, Wis.

Application May 24, 1950, Serial No. 163,906

8 Claims. (Cl. 98—29)

This invention appertains to building structures, and more particularly to safety compartments for office and public buildings, apartment houses, hotels, factories, etc. during enemy attack of cities, and is an improvement on our prior Patent No. 2,014,840, issued September 17, 1935.

One of the primary objects of our invention is to provide a safety zone in which the occupants of a building can take refuge during atom bomb or other lethal attack, where harmful rays and contaminated air are present, with means for effectively ventilating the safety zone with pure air.

Another salient object of the invention is the provision of superimposed air tight chambers for buildings with inter-communication means between the chambers for the various floors of the building, with a novel center breathing shaft extending through the chambers from the basement of a building to the roof thereof, the walls of the chambers being of a special construction to resist bomb blasts and harmful gamma rays and the like set up by atomic bombing.

A further object of the invention is to provide means for continuously removing foul air from the chambers or compartments and replacing the same with fresh air by means of the breather shaft, the fresh air being normally taken above the roof of the building, novel means being provided for insuring the intake of fresh, pure air above the roof level.

A still further object of the invention is to provide means whereby the foul air can be effectively filtered and cleansed and returned to the compartments, should the roof exhaust and intake means be destroyed or rendered useless by the outside air being too heavily contaminated for effective use by the intake system, means being also provided whereby oxygen from the basement can be utilized with the breather system.

A still further object of the invention is to provide a roof foul air discharge and a fresh air intake which includes a centrally disposed fresh air intake head and novelly arranged facing rotating foul air discharge members above and below the intake head for causing the carrying of foul air away from the head and providing a central protecting air intake zone, means being also provided for supplying a cooling water shower around the intake and exhaust zone for further protecting the fresh air intake.

A still further object of the invention is to provide a modified form of our invention which can be effectively utilized for removing foul air from kitchens, bathrooms, laundry rooms and the like in buildings.

With these and other objects in view, the invention consists in the novel construction, arrangement and formation of parts, as will be hereinafter more specifically described and claimed, and illustrated in the accompanying drawings, in which drawings, Figure 1 is a fragmentary, vertical sectional view through a building, illustrating the arrangement of the novel safety compartments therein and the novel centrally disposed breather shaft and the novel foul air exhaust and fresh air intake, the view being of a diagrammatic nature, the section being taken substantially on the line 1—1 of Figure 4.

Figure 2 is an enlarged, horizontal sectional view taken on the line 2—2 of Figure 1, illustrating the construction of the breather shaft in the basement of a building and the means for purifying the air for delivery to the fresh air outlets of the compartments.

Figure 3 is a detail, fragmentary vertical sectional view taken substantially on the line 3—3 of Figure 2, illustrating the basement construction, the view being on the same scale as Figure 2.

Figure 8 is a horizontal sectional view through the breather shaft, taken on the line 8—8 of Figure 1, in a plane slightly above Figure 5.

Figure 9 is a fragmentary side elevational view of the breather shaft illustrating a foul air intake register.

Figure 10 is a detail, vertical sectional view taken on the line 10—10 of Figure 9, illustrating the foul air intake register.

Figure 11 is a detail horizontal sectional view taken on the line 11—11 of Figure 9, looking in the direction of the arrows illustrating the foul air intake register.

Figure 12 is a fragmentary detail vertical sectional view taken substantially on the line 12—12 of Figure 13, illustrating one type of means for cutting off air intake and foul air discharge ducts from one compartment to another should upper compartments or the roof of a building be destroyed.

Figure 13 is a vertical sectional view taken at right angles to Figure 12 and on the line 13—13 of Figure 12.

Figure 14 is a fragmentary detail horizontal sectional view taken on the line 14—14 of Figure 12, illustrating the control for the air discharge and fresh air intake ducts.

Figure 20 is a fragmentary vertical sectional view through a building showing a modified form of our system being utilized for ventilating bathrooms, kitchens, basements and the like.

Figure 21 is a fragmentary, side elevational view, illustrating one of the foul air intake registers employed in the ventilating system.

Figure 22 is a longitudinal sectional view taken on the line 22—22 of Figure 21, looking in the direction of the arrows, the view illustrating the ventilating shaft and the air intake registers for the exhaust shaft.

Figure 23 is a detail horizontal sectional view taken on the line 23—23 of Figure 21, looking in the direction of the arrows.

Figure 24 is a detail fragmentary vertical sectional view, taken on the line 24—24 of Figure 21, looking in the direction of the arrows.

Figure 4:
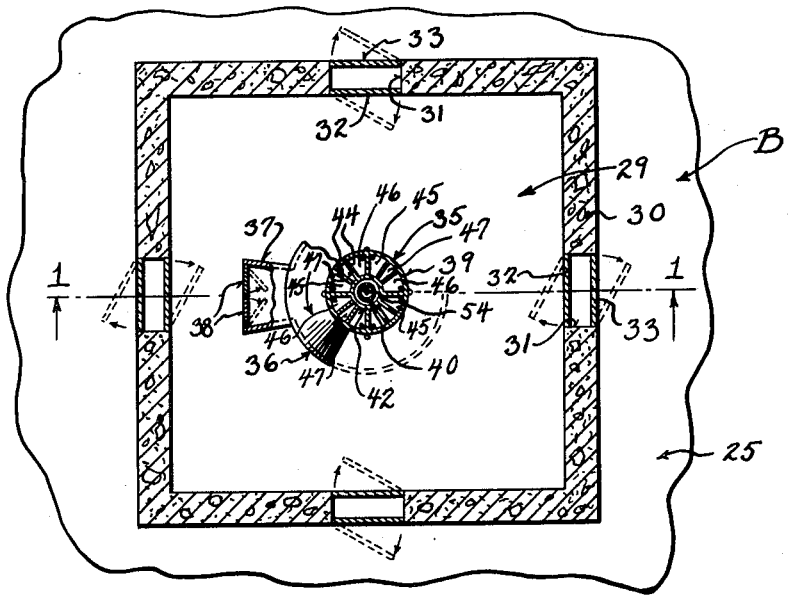
Figure 4 is a horizontal sectional view taken on the line 4—4 of Figure 1, looking in the direction of the arrows, illustrating the novel construction of a safety chamber and the breather shaft.
Figure 5:
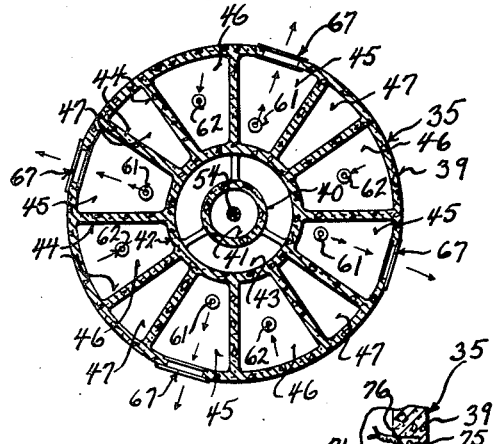
Figure 5 is an enlarged horizontal sectional view through the breather shaft illustrating the arrangement of the fresh air discharge ducts and the foul air intake ducts, the section being taken on line 5—5 of Figure 1, looking in the direction of the arrows.

Referring to the drawings in detail, wherein similar reference characters designate corresponding parts throughout the several views, the letter B generally indicates a multi-floored building, which can be of any character or type, such as a public building, an office skyscraper building or the like. As illustrated, the building B includes a series of floors 25, a basement 26, and an attic 27. The building is provided with any desired type of bomb resisting roof 28, which can be formed of concrete.

In accordance with our invention, a safety compartment or chamber 29 is built on each floor 25 of the building B and these chambers are arranged directly one above the other, in vertical alignment. The chambers 29 can be of any shape, such as round, oblong, or square, as is best shown in Figure 4 of the drawings. The walls 30 of the chambers or compartments are of a heavy special construction so as to resist bomb blasts, gamma and like rays from atomic bombing and the compartments or chambers can be formed of concrete and are rendered as near air tight as possible. All of the chambers are provided with entrance openings 31 and due to the thickness of the walls 30 inner and outer oppositely opening doors 32 and 33 can be effectively provided for each door opening. Hence, when the outer door, for instance, is open, the inner door 32 is still closed and remains closed until the outer door 33 is closed. This double door arrangement also effectively aids in retaining the sealing of the compartments.

Obviously, the compartments or chambers 29 can be incorporated in a new building at the time of the erection thereof or the chambers can be effectively incorporated with an existing building at a comparatively small expense, particularly where such building is provided with a central shaft, stairway or the like, and in all instances, the divisions between the compartments 29 formed by the floor, are also made as nearly bomb proof as possible and to resist atomic rays.

From the description so far, it can be seen that on each floor of a building, we have provided a safety zone in which the occupants of a large building can quickly take refuge in case of a lethal attack and means is provided, which will be later described, whereby persons taking refuge in the compartments can quickly slide from one compartment down to another.

In conjunction with the air tight compartments 29, we provide a novel centrally disposed breather shaft generally indicated by the reference character 35 and this shaft extends from the basement 26 of a building through the attic and roof 27 and 28, respectively. This shaft 35 is of a novel construction and is provided with novelly arranged air exhaust and intake ducts, which will be later identified and described in detail. At the present time, it can be seen that the shaft 35 is surrounded by a spiral tube 36, which forms a safety passageway leading from one floor to another, and this tube has communicating therewith at each floor level entrance vestibules 37 closed by doors 38. The tube 36 can be in the nature of a chute, whereby persons can slide from one floor level to another. Obviously, the tube could be provided with a stairway. The tube preferably, but not necessarily, ends at the first floor level.

The breather shaft 35 comprises an outer cylindrical wall 39, an inner cylindrical wall 40 defining a central foul air outlet shaft 41 and an intermediate cylindrical wall 42, which defines in conjunction with the central wall 40 a central fresh air intake shaft 43.

Radially extending partitions 44 connect the outer wall 39 and the intermediate wall 42, and these radially extending partitions can be different distances apart, for a purpose which will later appear, and these partitions extend substantially from one end of the breather shaft 35 to the other, as will later more fully appear. The radial partitions 44, and the outer and intermediate walls 39 and 42 define a plurality of (preferably four) longitudinally extending equidistantly spaced fresh air room distributing ducts 45 and a plurality of (preferably four) equidistantly spaced room foul air intake ducts 46. The partitions 44 also define at equidistantly spaced points, a plurality of (preferably four) longitudinally extending foul air outlet ducts 47. The foul air outlet ducts 47 are of a slightly smaller size than the fresh air room distributing ducts 45 and the foul air room intake ducts 56. From the description so far, it can be seen that the breather shaft includes a centrally disposed foul air outlet shaft 41 and foul air outlet ducts 47. The foul air outlet ducts 47 continue down into the basement 26 of a building below the main breather shaft and continue through the attic 27 and the roof of the building 28 above the main breather shaft 35. Likewise, the center fresh air intake 43 continues to the roof of the building as does the center foul air outlet shaft 40. Mounted upon the upper end of the center fresh air intake 43 is a fresh air intake head 48, which can be a considerable distance above the roof of the building. Mounted upon the roof of the building below the air intake head 48 is a foul air collector cylinder 49, and all of the foul air outlet ducts 47 communicate with the collection cylinder 49. Rotatably mounted upon the cylinder 49 is a foul air exhaust dome 50 and this exhaust dome 50 also rotates around the fresh air intake shaft 43. Leading radially outward from the dome 50 are foul air discharge nozzles 51 inclined upwardly and flared outwardly toward their discharge terminals. These nozzles 51 will be later described.

Figure 19:
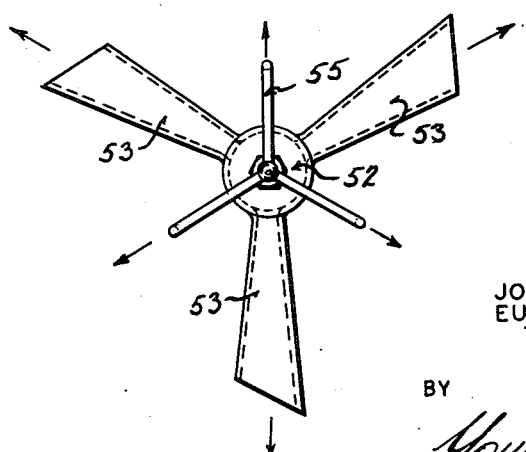
Figure 19 is an enlarged top plan view looking down on the water discharge shower and the uppermost foul air discharge head.

The centrally disposed foul air shaft 41 extends through the air intake head 48 and rotatably supports a foul air outlet dome 52. Extending radially from the dome 52 are discharge nozzles 53. These nozzles incline downwardly and outwardly and flare toward their discharge terminals. The discharge foul air nozzles 51 and the discharge foul air nozzles 53, as is best shown in Figure 19, have their discharge terminals cut at an angle and upon the discharge of foul air under pressure, as will be later set forth, the domes 50 and 52 will be rotated. As the nozzles 51 incline upwardly and outwardly, preferably at an angle of 60 degrees to the vertical, and the nozzles 53 incline downwardly and outwardly, preferably at an angle of 60 degrees to the vertical, a defined path of foul air discharge is had as indicated in dotted lines in Figure 1. The fresh air intake 48 is disposed between the domes 50 and 52 and the whirling flow of exhaust air defines a clear path for the intake of air into the head 48. At this time, it is to be noted that a water conducting pipe 54 extends axially through the foul air discharge shaft 41. This pipe communicates with a suitable source of water supply. Rigid with the dome 52 are water outlet nozzles 55. These nozzles point downwardly and as the nozzles rotate with the dome 52 a water shower is provided around the fresh air intake head 48 for washing and cleaning the fresh air taken in by the head 48. This is advantageous in peace times. During a raid, the water pressure is increased to a point where the water is expelled through the nozzles in a forcible manner to provide a water curtain to surround the air intake. The nozzles 55, as stated, rotate with the dome 52 and the upper end of the water distributing pipe 54 can have a rotatable connection with the remaining portion of the water conduit pipe.

Mounted within the basement 26 of the building are sets of air blowers or pumps 56 and 57, preferably of the rotary type. These air blowers can be driven from an electric motor 58. For the purpose of clarity, only one set of blowers has been illustrated. Communicating with the central fresh air shaft 43 are suction pipes 59. The suction pipes 59 communicate through a T coupling 60 with the intake of the air blower 56. Communicating with the outlet of each blower 56 is a fresh air conduit pipe 61. The pipes 61 lead to the fresh air room ducts 45. Hence, it can be seen that fresh air is drawn in through the head 48, shaft 43, through the air pumps 56 and hence into the fresh air room distributing ducts 45.

Communicating with the intake of the blowers 57 are suction pipes 62 and these suction pipes communicate with the room foul air collection ducts 46. Leading from the discharge of the blowers 47 are foul air conducting pipes 64 which communicate with the foul air discharge ducts 47 and these ducts in turn communicate with the foul air collection cylinder 49. Communicating with the pipe 64 in the basement through a T coupling 65 are foul air conducting pipes 66, and these pipes in turn lead to the foul air discharge shaft 41, which conducts the foul air to the discharge dome 52.

As intimated, communication is had between the rooms with the room fresh air ducts 45 and the room foul air collection ducts 46. Hence the safety rooms, compartments or chambers 29, are provided with a series of fresh air outlet registers 67, which communicate with the fresh air room distributing ducts 45. These registers are preferably arranged adjacent to the floor level. A series of foul air intake registers 68, are provided for the safety compartments and communicate with the foul air collection ducts 46. The registers 68 are preferably located adjacent to the ceilings of the safety compartments or chambers.

Figure 6:
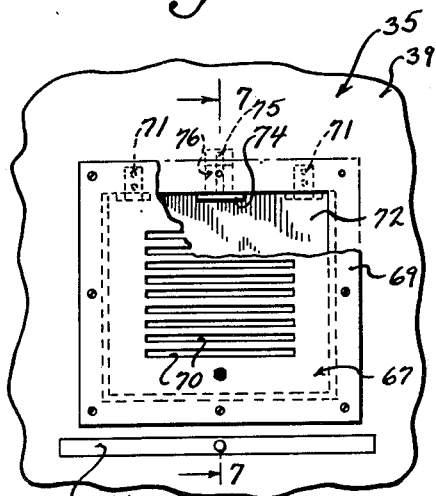
Figure 6 is an enlarged fragmentary side elevational view, illustrating one of the discharge registers for the fresh air communicating with a compartment.
Figure 7:
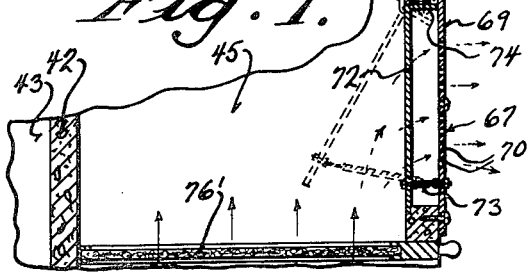
Figure 7 is an enlarged fragmentary vertical sectional view taken on the line 7—7 of Figure 6 further illustrating the fresh air discharge register.
Figure 15:
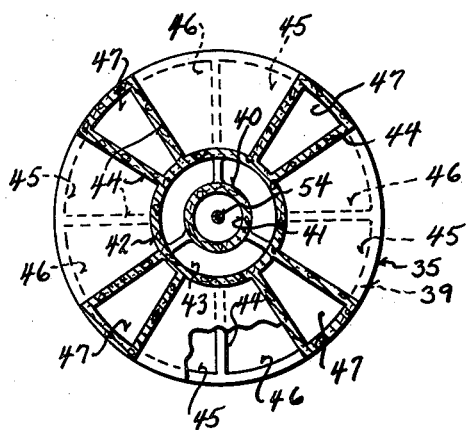
Figure 15 is a detail horizontal sectional view through the upper end of the breather shaft taken on the line 15—15 of Figure 1, looking in the direction of the arrows.
Figure 16:
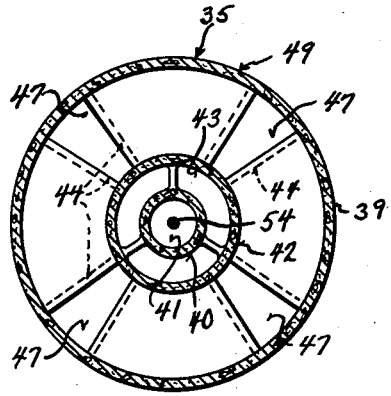
Figure 16 is a view similar to Figure 15, but taken on the line 16—16 of Figure 1, looking in the direction of the arrows.
Figure 17:
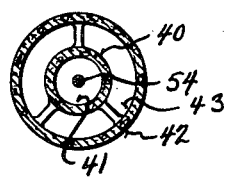
Figure 17 is a detail, horizontal sectional view taken on the line 17—17 of Figure 1, looking in the direction of the arrows illustrating the top of the breather shaft leading toward the air intake head.
Figure 18:
Figure 18 is a detail horizontal sectional view taken on the line 18—18 of Figure 1, looking in the direction of the arrows, illustrating the construction of the shaft leading to the uppermost foul air discharge head.

All of the registers 67 can be of a like construction, and can be of any desired construction. However, a preferred construction is specifically illustrated in Figures 6 and 7. Each of the registers 67 includes a face plate 69 rigidly secured to the outer wall 39 of the breather shaft over the register opening and the face plate is provided with a series of discharge slots 70. Hingedly mounted in place, as at 71, are swinging inner control gates 72. These gates are normally urged toward a closed position by contractile coil springs 73. It is preferred to automatically actuate the gates 72 in case of danger, and to accomplish this best, the following mechanism can be utilized. Each gate 72 adjacent to its upper end and at the point of hanging thereof, is provided with a rigid crank arm 74. In operative connection with the crank 74 is the core 75 of a solenoid 76. The solenoids are in circuit with a suitable source of supply of electrical energy and the circuit for the solenoids can be opened and closed by a suitable switch not shown. Obviously, when the gates 72 are open fresh air from the ducts 45 will be directed into the safety rooms or compartments through the registers 67. The preferred arrangement of the circuit is such that the registers for the different floors will be opened one after the other in proper sequence.

If desired, removable air filter screens 76' mounted in the ducts 45 can be provided, adjacent to each register 67 and these screens can be mounted so that the same can be removed for inspection (i. e. for determination of the presence of contaminated air), for cleaning and replacement.

In Figures 9, 10 and 11, we have illustrated one preferred form of the foul air register 68. These registers each include a slotted face plate 77. The inner face of each face plate carries vertical guide tracks 78 in which are slidably mounted slotted control gates 79. The slots in the control gates 79 can be brought into and out of register with the slots in the face plates 77. Contractile coil springs 80 are employed for normally holding the gates 79 in a raised position with their slots out of registration with the slots in the face plate. Operatively connected to the lower end of each gate 79 is a core 81 of a solenoid 82. Upon the closing of a circuit through the solenoid 82, the core 81 will be drawn down to open the register. The solenoids 82 can be, if desired, in the same circuit with the solenoids 76, and thus upon the closing of a switch, the registers 67 and 68 will be open in proper sequence for the different floors. Other arrangements can be made for opening and closing the circuit for the registers 68. Upon the opening of the registers 68 foul air will be sucked into the ducts 46 by the blowers 57.

In case of damage to the roof installation or any upper compartments, the fresh air distributing ducts 45 and the foul air collection ducts 46 can be closed at each room level. The means for accomplishing this is illustrated in detail in Figures 12 to 14, inclusive. In each compartment 29, is arranged an operating handle 83, for adjacent fresh and foul air ducts 45 and 46, and these ducts have disposed therein at each room level pivoted dampers or shut off butterfly valves 84. These valves 84 operate toward and away from seats 85. The dampers are connected through operating rods 86 with the operating handle 83. The operating handle can be raised or lowered and by so doing, the valves 84 can be opened or closed.

When damage has been done to the roof installation or upper compartments, the exhaust air drawn in by the blower 57 is purified and redelivered to the air ducts 45. This can be accomplished in the following way, as is best shown in Figures 2 and 3. An air purifier 87 is located between sets of blowers 56 and 57 and one end of the purifier has connection through a pipe 88 with the T coupling 60 of the fresh air intake pipe 59. The other end of the purifier has connection through a pipe 89 with the exhaust pipe 64. A control valve 90 is disposed in the length of each pipe 59 and a similar control valve 91 is disposed in the length of each pipe 88. The operating handles for these valves are operatively connected together so that upon operation of one valve the other will be operated therewith. A control valve 92 is arranged in the length of the pipe 89 and a similar control valve 93 is arranged in the length of the pipe 64. The operating handles for these valves 92 and 93 are also operatively connected together so that upon the actuation of one valve the other will be operated therewith. A control valve 94 is also arranged in the length of the foul air discharge pipe 66 for the control of foul air shaft 41. In operation, the valve 94 is closed, as is the valve 93, and the valve 92 is then opened. Foul air will then be drawn from the ducts 46 through the pipe 62 and will flow through the blower 47 through pipe 89 to the air purifier 87. At the time of the operation of the valves 92, 93 and 94, the valves 90 and 91 are also operated so as to close the valve 90 and open the valve 91. The blower 56 will then suck in air from the purifier 87 through the pipe 88 and delivery of purified air to the pipe 61 will be made, which in turn communicates with the fresh air distributing room ducts 45.

From the foregoing description, it can be seen that means has been provided for protecting the occupants of large buildings from atomic and other lethal air raids. The construction is such as to provide safety for occupants of buildings which are outside of the direct center or core of the atomic attack.

The breather shaft 35 constitutes a new structural system and the breather shaft provides 12 separate air ducts, one central fresh air intake pipe, and lower and upper exhaust domes. This constitutes an important safety feature. The breather shaft protrudes a certain desired height above the roof of the building and forms by the use of the exhaust air currents and water current a double cone shaped protection zone around the fresh air intake head. This combination of water and exhaust air currents crossing their paths at a 60 degree angle, protects the fresh air distributing system from being contaminated with poisonous air or radio active particles in emergencies.

A simplified form of our ventilating system can be used for apartments and like houses to facilitate the ventilating of basements, bathrooms, kitchens and the like, and this modified form of our invention is illustrated in Figures 20 to 24, inclusive. In accordance with our modified form of the invention, we provide a vertically extending duct 95 which leads from the basement or cellar of a building to the attic, and this duct can communicate with the intake of a rotary suction fan or blower 96. The outlet of the blower communicates with a discharge pipe 97, which leads through the roof of a building. The end of the discharge pipe 97 can be protected by any form of hood or cowl 98.

The duct 95 can be built in any number of different ways, such as by the use of pipe sections with the same either built into a wall or on the outside of a wall, or if preferred, a space between building uprights can be used as a duct. Registers 99 can be used for each room to be ventilated and these registers, of course, communicate with the duct 95. The registers can be of any desired character or type, but it is preferred to construct the same as shown in detail in Figures 21 to 24 inclusive. As illustrated in these figures, each register 99 embodies an outer slotted face plate 100, rigidly secured to a wall. Slidably mounted on the inside of each face plate in suitable guides 101, is a slotted control gate 102. Obviously, when the slots of the gate 102 are in registration with the slots of the face plate 100, communication is had between a room and a duct 95. An operating handle 103 is provided for moving the gates up and down to open and close the registers. As is clearly shown in Figure 22, the registers in one room are preferably disposed below the registers of an adjacent room and in case some register is disposed at such a height that the handle 103 cannot be conveniently reached, such handle can be connected to its gate by an elongated coupling rod 104. Each gate is normally held in a raised, closed position by means of coil springs 105 and the gates are opened against the tension of the springs. Operatively connected to the gates are switches 106 which control the circuit for the blower 96. Hence when a register is opened the blower will automatically start. This arrangement forms an ideal method of taking foul air from basements, bathrooms, kitchens, etc.

Changes in details may be made, without departing from the spirit or the scope of this invention, but what is claimed as new is:

1. A safety structure for protecting the occupants of a building during an atomic air attack or other lethal raid comprising interior walls defining a sealed chamber for each floor of a building with the chambers arranged one above the other in vertical alignment, the walls of the chambers being resistant to bomb blasts and atomic rays, entrance means into each chamber, a hollow column extending vertically through the building defining a breather shaft for the chambers, said breather shaft including a series of fresh air distributing ducts and foul air collection ducts, each fresh air distributing duct and each foul air collection duct extending vertically within said hollow column for substantially its entire length and each duct being sealed one from the other, means for establishing communication between the ducts and the chambers, an air intake tube in said breather shaft extending above the roof of the building, said air intake tube being separate and sealed from said fresh air distributing ducts and said foul air collection ducts for substantially its entire length, an air intake head for said fresh air tube, means including suction fans for drawing air through said head and fresh air tube and delivering the same to the fresh air distributing ducts, a foul air outlet arranged above the roof of the building, and means including suction fans for drawing air out of the foul air collection ducts and delivering said air to the foul air outlet, means for shutting off the fresh air distributing ducts and the foul air collection ducts at each floor level.

2. In a building including a plurality of floors, interior walls defining a sealed safety chamber for each floor, the chambers being superimposed one above the other in vertical alignment, each of said chambers having at least one entrance vestibule, inner and outer doors for each vestibule, a centrally disposed hollow column extending through the building and through said chambers and protected by said interior walls defining a breather shaft, means for distributing fresh air to the chambers and means for withdrawing air from the chambers through the hollow column.

3. In a building including a plurality of floors; interior walls defining a sealed safety chamber for each floor, said chambers being arranged one above the other in vertical alignment, doors connecting the floors and chambers, a centrally disposed hollow column extending through the floors and chambers defining a breather shaft, a series of foul air collection ducts and fresh air distributing ducts in said hollow column, each fresh air distributing duct and each foul air collection duct extending vertically within said hollow column for substantially its entire length and each duct being sealed one from the other, means connecting the ducts with each chamber, a fresh air intake extending above the building, means for sucking in air through the fresh air intake and delivering the same to the fresh air distributing ducts, foul air exhausts disposed above the roof of the building, said foul air exhausts being arranged in spaced sets, one set above the other and means for drawing foul air from the foul air collection ducts and delivering the same to the foul air exhausts, said air intake being arranged between the sets of exhausts and said exhausts including air discharge nozzles, the nozzles of each respective set being inclined toward one another at an angle of 60 degrees relative to the vertical.

4. In a building including a plurality of floors, interior walls defining a sealed safety chamber for each floor having protected entrances, said chambers being arranged one above the other in vertical alignment, a hollow column extending entirely through the building and the chambers including an outer wall, an inner wall, and an intermediate wall, said walls being concentric, partitions connecting said intermediate wall and the outer wall defining in conjunction with said walls four independent fresh air distributing ducts, four foul air collection ducts and four foul air discharge ducts, said inner and intermediate walls defining a fresh air intake shaft, and the said inner wall constituting a foul air outlet pipe, a fresh air entrance head for the fresh air intake shaft, said foul air outlet ducts extending through the roof of a building, a foul air collection cylinder above the roof of the building communicating with the foul air collection ducts, said foul air collecting cylinder terminating below said fresh air entrance head, a foul air exhaust outlet for said cylinder adjacent the upper end of said cylinder and disposed below the fresh air entrance head, said foul air outlet pipe extending upwardly and terminating above said fresh air entrance head, a foul air exhaust outlet adjacent the upper end of the central foul air outlet pipe and arranged above the fresh air entrance head, means establishing communication between the chambers for the fresh air distributing ducts and the foul air collection ducts, means for sucking air from the fresh air shaft and the collection head and for delivering said air to the fresh air distributing ducts, and means for drawing air from the foul air collection ducts and delivering the same to the foul air outlet ducts and foul air collection cylinder and the foul air outlet pipe.

5. A safety structure for protecting the occupants of a building as defined in claim 1, and purifying means for air withdrawing from the foul air collection ducts and for delivering the purified air to the fresh air distributing ducts.

6. In a building including a plurality of floors; a safety refuge structure therein for protecting the occupants of the building against explosives and other lethal attacks comprising a sealed safety chamber for each floor having heavy walls, said chambers being arranged one above the other in vertical alignment, doors connecting the floors and chambers, and a hollow column positioned vertically in said building constituting a breather shaft extending through the floors and chambers and protected by the walls of the chambers, said breathershaft including an outer wall, an inner wall and an intermediate wall, said walls being concentric defining three vertically extending tubes set one within the other, said outer tube including foul air collection ducts and fresh air distributing ducts, each fresh air distributing duct and each foul air collection duct extending vertically within said outer tube and each duct being sealed one from the other, means connecting the ducts with each chamber, a fresh air intake extending above the building and connected to said intermediate tube, means for sucking in air through the fresh air intake and delivering the same to the fresh air distributing ducts, foul air outlets disposed above the roof of the building connected to said innermost tube, and means for drawing foul air from the foul air collection ducts and delivering the same to the foul air outlets, said outlets being arranged above and below the air intake.

7. In a building including a plurality of floors, as defined in claim 6, and said foul air outlets including air discharge nozzles inclining toward one another.

8. In a building including a plurality of floors, as defined in claim 6, and said outlets including discharge nozzles inclining toward one another, and a water shower arranged above the uppermost outlet.

References Cited in the file of this patent

UNITED STATES PATENTS

| Number | Name | Date |
|---|---|---|
| 332,379 | Burgess | Dec. 15, 1885 |
| 381,112 | Colby | Apr. 17, 1888 |
| 472,163 | Duffy | Apr. 5, 1892 |
| 921,966 | Elward | May 18, 1909 |
| 1,289,856 | Maxim | Dec. 31, 1918 |
| 2,014,840 | Geiger et al. | Sept. 17, 1935 |
| 2,120,883 | Brace et al. | June 14, 1938 |

FOREIGN PATENTS

| Number | Country | Date |
|---|---|---|
| 506,956 | France | June 10, 1920 |
| 793,631 | France | Nov. 23, 1935 |
| 298,510 | Great Britain | Oct. 8, 1928 |
| 212,657 | Switzerland | Mar. 3, 1941 |